Patented May 29, 1928.

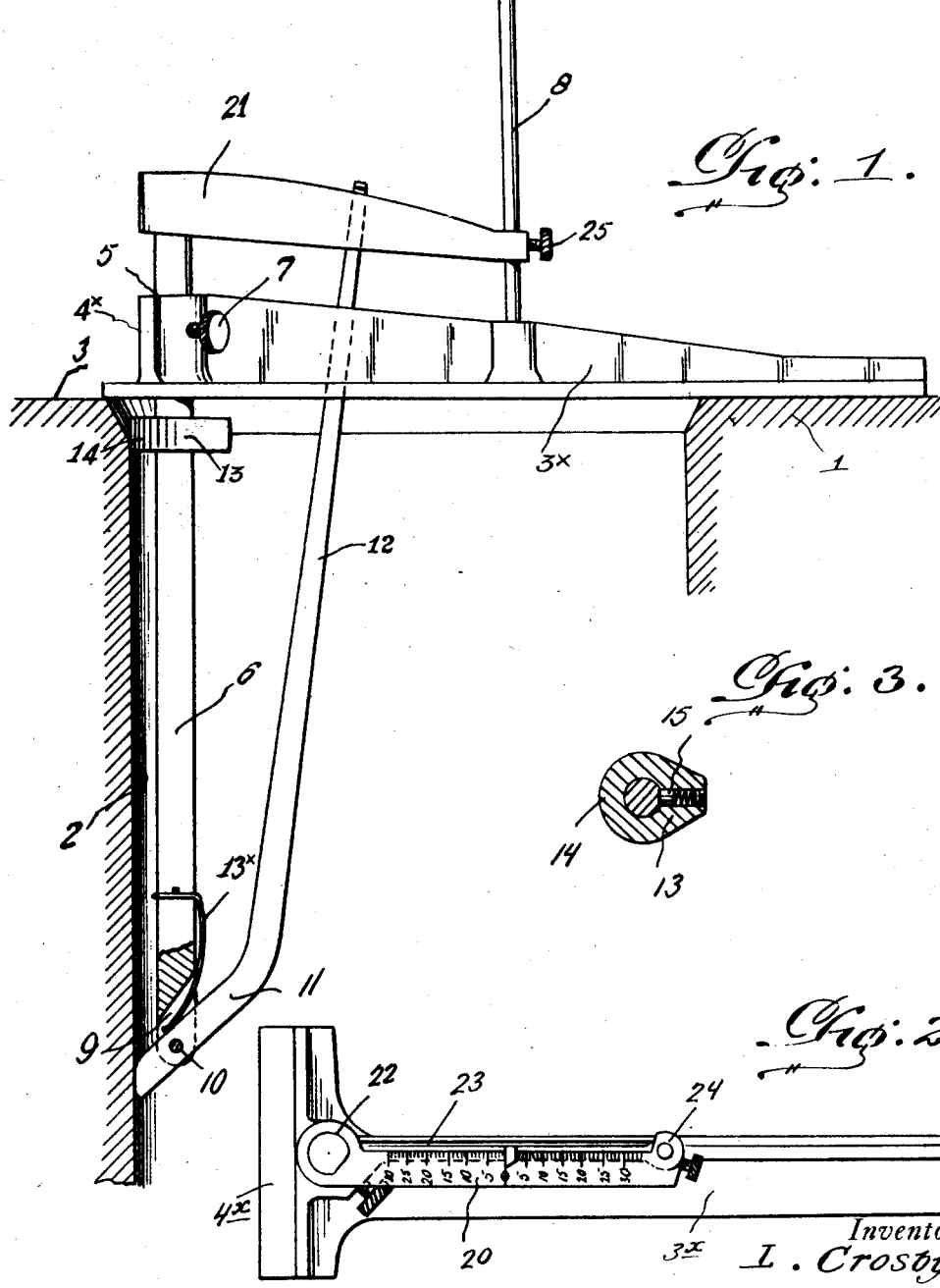

1,671,703

UNITED STATES PATENT OFFICE.

LESLIE CROSBY, OF ASTORIA, OREGON.

GAUGE.

Application filed April 28, 1926. Serial No. 105,193.

My present invention pertains to gauges, and contemplates the provision of an easily applied and accurate cylinder alinement gauge—i. e., a gauge for testing the alinement of a cylinder or round hole with respect to a plane surface at the end of the cylinder or hole.

Other objects and practical advantages of the invention will be fully understood from the following description and claims when the same are read in connection with the drawings, accompanying and forming part of this specification, in which:—

Figure 1 is a view, partly in elevation and partly in section, illustrating my novel gauge as properly arranged with respect to a cylinder.

Figure 2 is a top plan view of the gauge.

Figure 3 is a detail horizontal section taken through the slidable contact member of my improvement and the spindle on which said contact member is mounted.

Similar numerals of reference designate corresponding parts in all of the views of the drawings.

I show in Figure 1, a cylinder block 1, and the bore of the cylinder in said block is designated by 2, and the plane surface at the end of the cylinder is designated by 3. Among other elements my novel gauge comprises a body or bridge bar $3^x$, the said body $3^x$ being flat and straight at its underside so as to bridge the cylinder opening and rest solidly on the plane surface 3 at diametrically opposite points. The said body $3^x$ is headed at $4^x$ and is provided with a vertically disposed bore 5 which is preferably shaped as shown so as to permit of rectilinear movement of an upright spindle 6 through the said bore 5 while preventing turning of the spindle about its axis in the body $3^x$. The spindle 6 is adjustably fixed to the body $3^x$ through the medium of a set screw 7. It will also be noticed that the body $3^x$ is equipped with an upright post 8.

The lower end portion of the spindle 6 is bifurcated as designated by 9 and in said bifurcation is pivoted at 10 the angularly deflected lower portion 11 of the swingable indicating finger 12 of the gauge. The said finger 12 is engaged by and is subject to the action of an appropriate spring $13^x$ carried by the spindle 6 and extending into the bifurcation 9 so as to bear on the laterally deflected portion of the finger 12 after the manner shown in Figure 1. The spring $13^x$ tends to throw or move the upper end of the finger 12 toward the right in Figure 1.

The lower end of the finger 12 is preferably rounded as illustrated in Figure 1 and constitutes the lower contact of the gauge. The upper contact or contact member of the gauge is designated by 13 and is preferably rounded as designated by 14 and is equipped with a spring-pressed pin 15 through the medium of which the contact member 13 is adjustably held by frictional contact on the spindle 6. Manifestly the contact member 13 may be readily adjusted on the spindle 6 in the direction of the length of the latter and the said contact member will be frictionally held in the position in which it is placed.

The spindle 6 has fixed thereto a lateral arm 21 on which is a graduated scale 20, Figure 2, and by which is carried a set screw 25 engaging the post 8. The scale 20 is graduated to represent thousandths of an inch. The post 8 extends through an aperture in the arm 21. It will also be understood that the arm 21 has a slot 23, Figure 2, in which the upper end of the finger 12 is adapted to move, the said end being provided with a lateral pointer for cooperation with the graduated scale 20.

In the general use of the gauge, if the cylinder is eight inches in length, set the spindle 6 so there is a distance of four inches from the lower contact to the upper contact and insert the gauge in the cylinder pressed firmly against one side of the cylinder. Assume the index registers .012. Reverse the instrument and press to the other side of the cylinder. Assume the index registers .008, but on the other side of the zero point, the sum of the two readings .020 inches is the error of alinement. The difference in the two readings, .004 inches in this instance, is the taper or wear except where the finger rests on the same side of the zero point on both tests; the sum of the two readings being then the taper, and the difference, the error of alinement. It should also be noted that in adjusting the gauge, the spindle should be locked firmly before tightening the screw 25. The slidable contact should always be as close to the top as possible. The reason for using the gauge on only one half of the cylinder is that by so using the gauge the alinement of one side of the cylinder is compared with the alinement directly opposite, the result being that the answer obtained is the correct alinement of the center line of the cylinder, irrespective of other conditions such as taper or error in the gauge itself.

The reading obtained is always in thousandths of an inch regardless of the distance between the contacts.

I have entered into a detailed description of the construction and relative arrangement of the parts embraced in the present and preferred embodiment of my invention in order to impart an exact understanding of said embodiment. I do not desire, however, to be understood as limiting myself to the precise construction and relative arrangement of parts as disclosed, my invention being defined by my appended claims within the scope of which modifications may be made without departure from my invention.

Having described my invention, what I claim and desire to secure by Letters Patent, is:—

1. In a gauge, and in combination, a body, a spindle associated with said body and disposed at right angles thereto, a contact member on the spindle, a scale bearing member carried by the spindle and spaced outwardly from the body and extending in the same general direction as the body, and a spring influenced finger pivotally connected to the spindle and having a contact portion spaced from said contact member and also having a portion for cooperation with the scale on the scale bearing member and swingably movable relative to the body and said scale bearing member.

2. In a gauge, and in combination, a body, a spindle associated with said body and disposed at right angles thereto, a contact member on the spindle, a scale bearing member carried by the spindle and spaced outwardly from the body and extending in the same general direction as the body, and a spring influenced finger pivotally connected to the spindle and having a contact portion spaced from said contact member and also having a portion for cooperation with the scale on the scale bearing member and swingably movable relative to the body and said scale bearing member; the said spindle being adjustably fixed to said body, and the said contact member being adjustable on the spindle in the direction of the length thereof and held by frictional contact to the spindle and against casual movement.

3. In a gauge, and in combination, a body adapted to bridge a cylinder opening and rest on a plane surface at opposite sides of said opening, a spindle extending through, means for adjustably fixing the spindle to the body, an arm on the upper portion of the spindle and bearing a scale, a contact member slidable on the spindle and adjustably maintained by frictional contact thereon, and a spring influenced finger pivoted at an intermediate point of its length to the spindle and having a contact at one end spaced from said contact member and also having a finger at its other end for cooperation with the scale on the said spindle arm.

4. In a gauge, and in combination, a body adapted to bridge a cylinder opening and rest on a plane surface at opposite sides of said opening, a spindle extending through, means for adjustably fixing the spindle to the body, an arm on the upper portion of the spindle and bearing a scale, a contact member slidable on the spindle and adjustably maintained by frictional contact thereon, and a spring influenced finger pivoted at an intermediate point of its length to the spindle and having a contact at one end spaced from said contact member and also having a finger at its other end for cooperation with the scale on the said spindle; the said body being equipped with an upright post in parallelism with said spindle, and the said arm of the spindle having a bore receiving said post and being equipped with a set screw whereby said arm may be adjustably fixed to said post.

In testimony whereof I affix my signature.

LESLIE CROSBY.